(12) United States Patent
Jones (10) Patent No.: US 10,419,681 B2
(45) Date of Patent: Sep. 17, 2019

(54) VARIABLE FIELD OF VIEW MULTI-IMAGER

(71) Applicant: Robert Bosch GmbH, Stuttgart (DE)

(72) Inventor: Theodore Leroy Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 15/334,473

(22) Filed: Oct. 26, 2016

(65) Prior Publication Data

US 2018/0115720 A1     Apr. 26, 2018

(51) Int. Cl.
*H04N 7/00* (2011.01)
*H04N 5/232* (2006.01)
*H04N 5/225* (2006.01)

(52) U.S. Cl.
CPC ....... *H04N 5/23296* (2013.01); *H04N 5/2252* (2013.01); *H04N 5/2253* (2013.01); *H04N 5/2254* (2013.01); *H04N 5/2258* (2013.01); *H04N 5/23238* (2013.01)

(58) Field of Classification Search
CPC ... H04N 5/23238; H04N 5/247; H04N 13/243
USPC .......................................................... 348/36
See application file for complete search history.

(56) References Cited

U.S. PATENT DOCUMENTS

| | | | |
|---|---|---|---|
| 6,850,025 B1* | 2/2005 | Paolantonio | G03B 17/55 318/599 |
| 7,440,027 B2 | 10/2008 | Weaver | |
| 7,680,192 B2 | 3/2010 | Kaplinsky | |
| 7,855,752 B2 | 12/2010 | Baker et al. | |
| 8,279,283 B2 | 10/2012 | McCormack | |
| 8,325,229 B2 | 12/2012 | Jones et al. | |
| 9,094,540 B2 | 7/2015 | Venable et al. | |
| 9,124,801 B2 | 9/2015 | Shan et al. | |
| 9,232,155 B1 | 1/2016 | Tanner | |
| 9,819,863 B2* | 11/2017 | Osborne | G02B 13/0075 |
| 2004/0062541 A1* | 4/2004 | Kajino | F16M 11/10 396/427 |
| 2007/0126863 A1* | 6/2007 | Prechtl | H04N 5/232 348/43 |

(Continued)

OTHER PUBLICATIONS

Arecont Vision, AV20175DN <https://www.arecontvision.com/product/SurroundVideo+Omni+G2+Series/AV20175DN-28#KeyFeatures> Publicly available at least as early as Feb. 5, 2016.

(Continued)

*Primary Examiner* — Jamie J Atala
*Assistant Examiner* — Masum Billah
(74) *Attorney, Agent, or Firm* — Michael Best & Friedrich LLP (57) ABSTRACT

A multi-imager assembly including a plurality of imagers, a chassis, a drive assembly, and a controller. The plurality of imagers is operable to produce a composite image, with each of the plurality of imagers having optical zoom capability such that each of the plurality of imagers has a variable field of view. The chassis movably supports the plurality of imagers, and the drive assembly is operable to move the plurality of imagers while supported by the chassis. The controller is operable to coordinate movement of the plurality of imagers based at least in part upon the variable field of view of each of the plurality of imagers to produce the composite image.

19 Claims, 6 Drawing Sheets

(56) References Cited

U.S. PATENT DOCUMENTS

| | | | |
|---|---|---|---|
| 2007/0235648 A1* | 10/2007 | Teich | G08B 13/19641 |
| | | | 250/330 |
| 2008/0024390 A1* | 1/2008 | Baker | G06T 3/4053 |
| | | | 345/1.3 |
| 2010/0033577 A1 | 2/2010 | Doak et al. | |
| 2010/0238262 A1* | 9/2010 | Kurtz | H04N 7/142 |
| | | | 348/14.01 |
| 2010/0296802 A1* | 11/2010 | Davies | G03B 17/00 |
| | | | 396/77 |
| 2012/0098927 A1* | 4/2012 | Sablak | G08B 13/19604 |
| | | | 348/36 |
| 2013/0044181 A1 | 2/2013 | Baker et al. | |
| 2014/0139623 A1 | 5/2014 | McCain et al. | |
| 2015/0009350 A1 | 1/2015 | Sarwari et al. | |
| 2015/0304559 A1 | 10/2015 | Glasse | |

OTHER PUBLICATIONS

Arecont Vision, AV12176DN <https://www.arecontvision.com/product/SurroundVideo+Omni+G2+Series/AV12176DN-08#KeyFeatures> Publicly available at least as early as Feb. 5, 2016.

Axis Communications, AXIS Q3709-PVE Network Camera <http://www.axis.com/ie/en/products/axis-q3709-pve> Publicly available at least as early as Feb. 5, 2016.

\* cited by examiner

FIG. 5B

# VARIABLE FIELD OF VIEW MULTI-IMAGER

BACKGROUND

The present invention relates to image capture technology, specifically to pan, tilt, and zoom ("PTZ") cameras and panoramic cameras.

PTZ cameras allow for the view of an image to be adjusted via pan, tilt, horizon, or zoom functions. PTZ cameras can be used in various environments and for various applications e.g., television or movie studios, sporting events, and for surveillance or security applications. Unlike PTZ cameras, panoramic cameras are often static. Panoramic cameras stitch together video output from multiple individual imagers side-by-side to produce the panoramic image, which has a wide aspect ratio. Panoramic cameras often do not possess zooming capabilities. The panoramic image will break apart as the field of view decreases in a zoom-out function or will overlap images as the field of view increases in a zoom-in function.

SUMMARY

In one exemplary embodiment, the invention provides a multi-imager assembly including a plurality of imagers operable to produce a composite image, with each of the plurality of imagers having optical zoom capability such that each of the plurality of imagers has a variable field of view. A chassis movably supports the plurality of imagers. A drive assembly is operable to move the plurality of imagers while supported by the chassis. A controller is operable to coordinate movement of the plurality of imagers based at least in part upon the variable field of view of each of the plurality of imagers to produce the composite image.

In another exemplary embodiment, the invention provides a method of providing a composite image with a variable field of view. The method includes providing a plurality of imagers operable to produce a composite image, with each of the plurality of imagers having optical zoom capability such that each of the plurality of imagers has a variable field of view. The method further includes providing a chassis movably supporting the plurality of imagers and providing a drive assembly operable to move the chassis. Additionally, the method coordinates movement of the plurality of imagers based at least in part upon the variable field of view of each of the plurality of imagers to produce the composite image.

DETAILED DESCRIPTION

FIGS. 1-5B illustrate and describe a multi-imager assembly 1 capable of producing a composite or panoramic image with an optical zoom capability. The multi-imager assembly 1 makes adjustments to a plurality of imagers 2, 4, 6, 8 in a coordinated manner to maintain a seamless variable field of view such that the panoramic image does not break apart when the field of view decreases i.e., a zoom-out function, or wastes imager coverage as the field of view increases i.e., a zoom-in function. The optical zoom capability is implemented by driving the plurality of imagers 2, 4, 6, 8 such that each of the plurality of imagers 2, 4, 6, 8 is capable of having a variable field of view. Accordingly, in the exemplary multi-imager assembly 1, the plurality of imagers 2, 4, 6, 8 operate and move together to produce the composite image with each of the plurality of imagers 2, 4, 6, 8 having optical zoom capability such that each of the plurality of imagers 2, 4, 6, 8 has a variable field of view. The variable field of view panoramic image of the multi-imager assembly 1 is produced by utilizing equations, which are described in detail below, that relate the number of individual imagers and their associated field of views with the rotational ratios of the angle adjustment required to align an optical plane of symmetry of each individual imager through the optical zooming adjustment.

Figure 1:
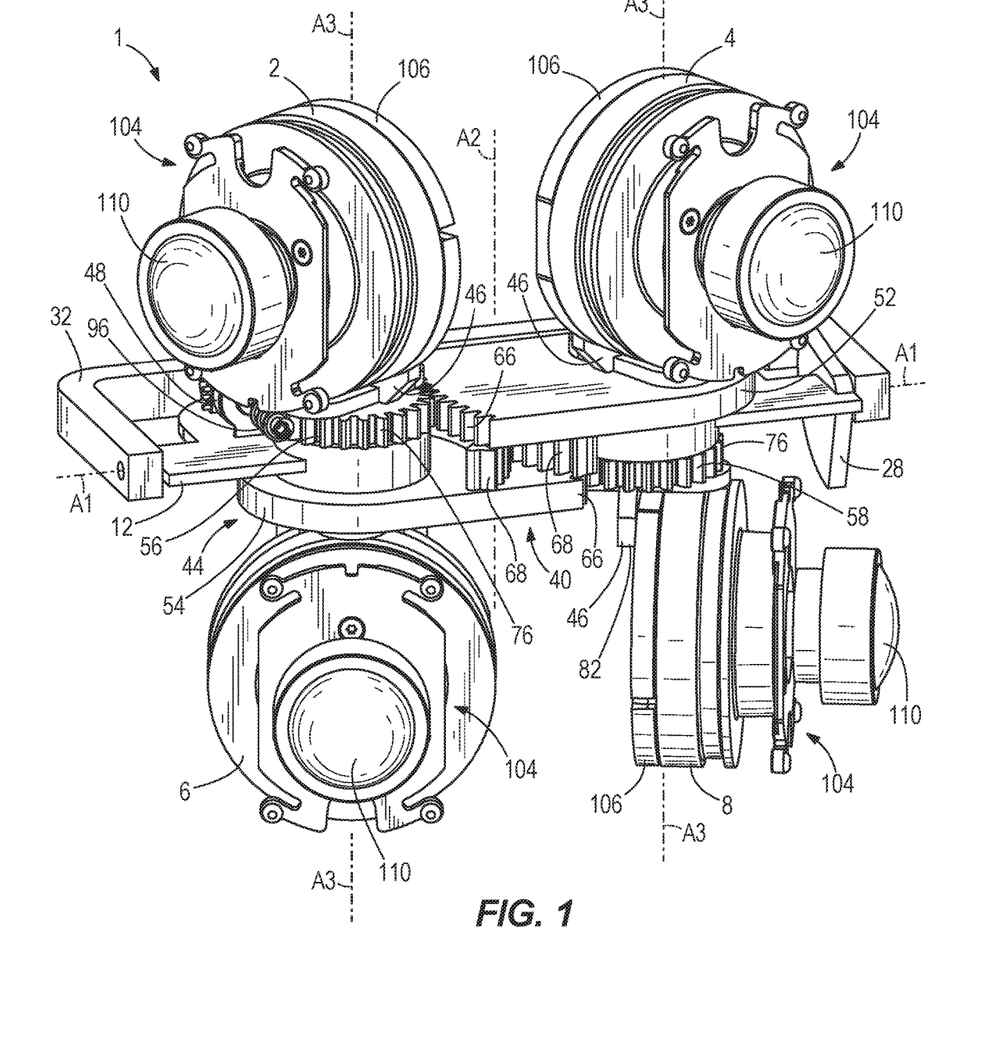
FIG. 1 is a perspective view of an exemplary multi-imager assembly embodying the invention.
Figure 2:
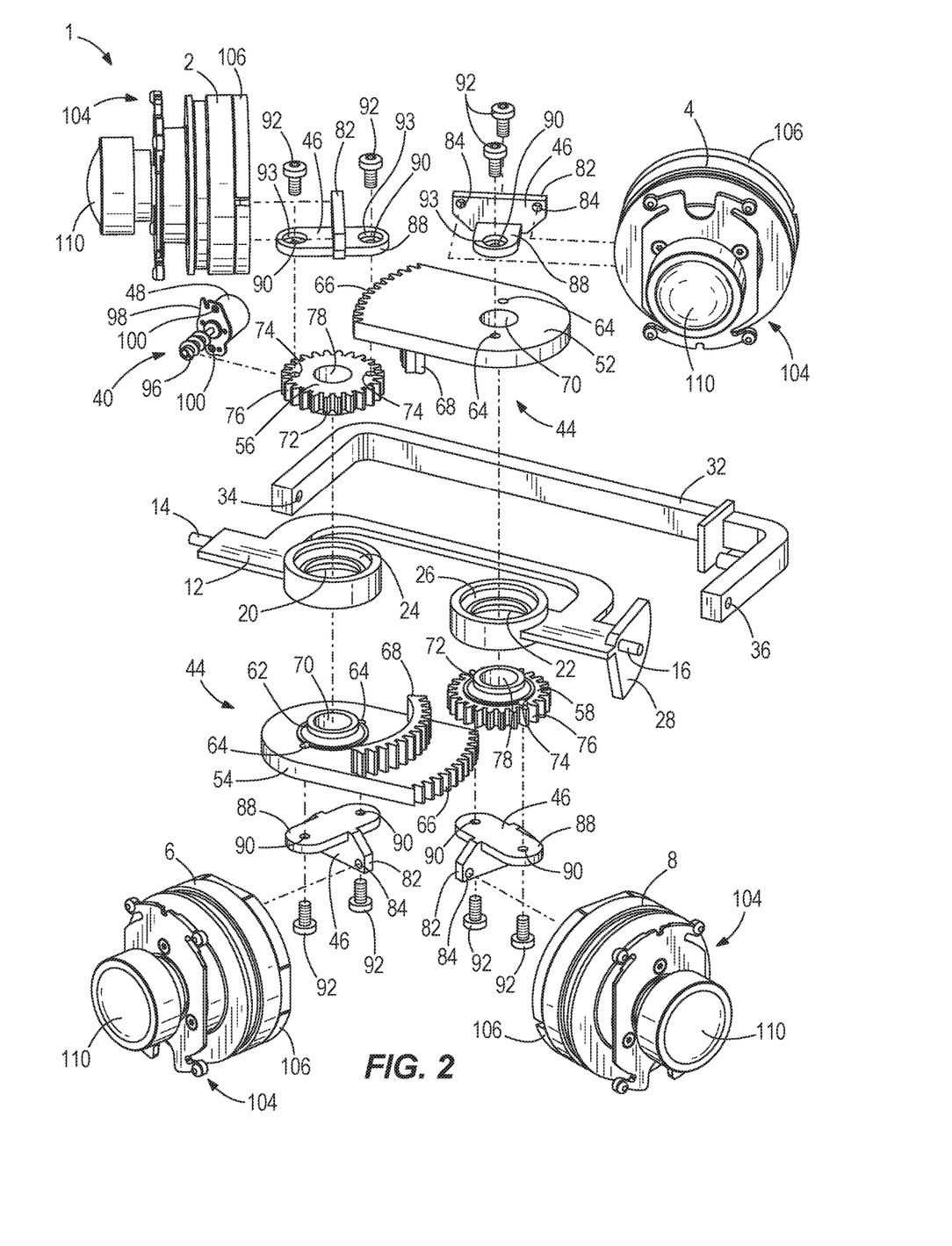
FIG. 2 is an exploded isometric view of the exemplary multi-imager assembly of FIG. 1.

FIGS. 1 and 2 illustrate an exemplary embodiment of a multi-imager assembly 1 including a plurality of imagers 2, 4, 6, 8. In various exemplary embodiments, the multi-imager assembly 1 can have a varied number of imagers. For example, the multi-imager assembly 1 can have four individual imagers 2, 4, 6, 8 as shown in FIGS. 1 and 2. Alternatively, other exemplary embodiments can have two imagers, such as the top pair of imagers 2 and 4 or the bottom pair of imagers 6 and 8 shown in FIGS. 1 and 2.

The multi-imager assembly 1 further includes a chassis 12. As shown in FIG. 2, the chassis 12 includes shafts 14, 16, apertures 20, 22 having two pairs of countersinks 24, 26, and a tilt plate 28. The chassis 12 is pivotably coupled to a mounting member 32 having through holes 34, 36. The mounting member 32 can be movably coupled or fixed to a fixture (not shown) (e.g., a pole, wall, ceiling, etc.) to provide support to the multi-imager assembly 1. The through hole 34 pivotably receives the shaft 14 and the through hole 36 pivotably receives the shaft 16 such that the chassis 12 tilts about a horizontal axis A1 of the multi-imager assembly 1. This allows for the plurality of imagers 2, 4, 6, 8 to tilt together on the chassis 12. An actuator (not shown) can be coupled to the mounting member 32 to drive the tilt plate 28 of the chassis 12 to tilt the chassis 12 about the horizontal axis A1. In other exemplary embodiments, a bearing member (not shown) is positioned between the mounting member 32 and the fixture. In this embodiment, another actuator (not shown) can be coupled to the mounting member 32 to drive the mounting member 32 relative to the bearing member allowing for the chassis 12 to pan about a vertical axis A2 of the multi-imager assembly 1.

As shown in FIGS. 1 and 2, the multi-imager assembly 1 further includes a drive assembly 40. The drive assembly 40 includes a plurality of gears 44, brackets 46, and a motor 48. The plurality of gears 44 includes a first pair of gears 52, 54 and a second pair of gears 56, 58. Each of the first pair of gears 52, 54 includes include a hub 62, through holes 64, a first set of teeth 66, a second set of teeth 68, and an aperture 70. The first set of teeth 66 is formed in a distal end of the gears 52, 54, while the second set of teeth 68 is formed on an arcuate projection extending from the face of the gears 52, 54 in a same direction as the hub 62 extends. Each of the second pair of gears 56, 58 includes a hub 72, through holes 74, teeth 76, and an aperture 78. The hub 62 of the gear 52 and the hub 72 of the gear 58 are rotatably received into the pair of countersinks 26 of the chassis 12. Similarly, the hub 62 of the gear 54 and the hub 72 of the gear 56 are rotatably received into the pair of countersinks 24 of the chassis 12. In an exemplary embodiment, the hubs 62 and 72 and the pair of countersinks 24 and 26 each can have re-entrant ball races (not shown) configured to receive bearing balls. A center axis of the ball races of the hubs 62 and 72 and a center axis of the countersinks 24 and 26 would be initially mis-aligned for assembly. This allows for bearing balls to be introduced into the ball races on one side of either the hubs 62 and 72 or the countersinks 24 and 26. The ball races would then be aligned so that the center axes of the ball races were coincident. The bearing balls would be tangentially distributed evenly through each of the ball races, and can be held in this position by a bearing ball cage. This exemplary embodiment allows for the hubs 62 and 72 to be rotatably received in the countersinks 24 and 26 of the chassis 12. However, other exemplary embodiments may be used to achieve the function described above (e.g., press or snap fitting the hubs into standard bearings on the countersinks of the chassis).

The brackets 46 each include an imager attachment portion 82 having through holes 84 and a gear attachment portion 88 having through holes 90 with corresponding countersinks 93. The imager attachment portion 82 couples the brackets 46 to the plurality of imagers 2, 4, 6, 8 by receiving fasteners (not shown) in the through holes 84. The fasteners are then fastened into each of the plurality of imagers 2, 4, 6, 8 to secure the plurality of imagers to the multi-imager assembly 1. To secure the respective imagers 2, 4, 6, 8 to the respective gears 52, 54, 56, 58, fasteners 92 (e.g., screws) are received in the through holes 90 of the gear attachment portion 88 and are received in the through holes 64 of the first pair of gears 52, 54 and in the through holes 74 of the second pair of gears 56, 58. The fasteners 92 are then tightened such that the head of each of the fasteners 92 is in communication with the countersink 93 of each through hole 90 to couple the plurality of imagers 2, 4, 6, 8 to the drive assembly 40. As illustrated, the imager 2 is secured to the gear 56 by its bracket 46, the imager 4 is secured to the gear 52 by its bracket 46, the imager 6 is secured to the gear 54 by its bracket 46 and the imager 8 is secured to the gear 58 by its bracket 46.

The motor 48 includes a worm gear 96 on its output pinion and an attachment portion 98 having through holes 100. The attachment portion 98 is configured to couple the motor 48 to the multi-imager assembly 1 by receiving fasteners (not shown) in the through holes 100. For example, the motor 48 can be coupled to the chassis 12. In the exemplary embodiment shown in FIGS. 1 and 2, the motor 48 is coupled to the multi-imager assembly 1 adjacent to one of second pair of gears 56 such that the worm gear 96 intermeshes with the teeth 76 of the gear 56. In other exemplary embodiments, the motor 48 is coupled to the multi-imager assembly adjacent to the gear 58 such that the worm gear 96 intermeshes with the teeth 76 of the gear 58. Other embodiments may use more motors to drive each of the imagers individually.

The drive assembly 40 having the plurality of gears 44 is configured to drive movement of the plurality of imagers 2, 4, 6, 8. As shown in FIG. 1, the first pair of gears 52, 54 and the second pair of gears 56, 58 have an intermeshing relation to rotatably drive each of the plurality of imagers 2, 4, 6, 8 about a respective vertical axis A3. In the exemplary embodiment shown in FIGS. 1 and 2, the motor 48 rotates the worm gear 96, which has an intermeshing relation to the teeth 76 of gear 56, to drive the gear 56 providing the rotational movement of imager 2. The rotational movement of the gear 56 having teeth 76, which have an intermeshing relation to the first set of teeth 66 of the gear 52, drives the gear 52 providing rotational movement of imager 4. The gear 52 and the gear 54 have the symmetrical second set of intermeshing teeth 68 such that motion is transferred from the gear 52 to the gear 54, thereby providing rotational movement of imager 6. Therefore, the intermeshing second set of teeth 68 transmits rotation between the upper pair of images 2, 4 and the lower pair of imagers 6, 8. The first set of teeth 66 of gear 54, which have an intermeshing relation to the teeth 76 of the gear 58, drive the gear 58 providing rotational movement of the imager 8. In an exemplary embodiment, the first pair of gears 52, 54 has seventy-two teeth and the second pair of gears 56, 58 has twenty-four teeth in each of the tooth sets 66 and 68. This configuration produces a 3-to-1 gear ratio for the four imagers 2, 4, 6, 8 and allows all four imagers 2, 4, 6, 8 to simultaneously pivot about the respective axes A3 symmetrically. Relative field of view spacing is maintained for each of the plurality of imagers 2, 4, 6, 8 to produce the seamless composite or panoramic view.

As shown in FIGS. 1 and 2, each of the plurality of imagers 2, 4, 6, 8 includes a lens portion 104 and an attachment portion 106. The lens portion 104 includes a lens 110 at a distal end of each of the plurality of imagers 2, 4, 6, 8. The lens 110 is adjustable to produce the variable field of view. The lens portion 104 further includes a lens actuator 114, as shown schematically in FIG. 3, to drive the lens 110 to produce the variable field of view. The attachment portion 106 is configured to couple each of the plurality of imagers 2, 4, 6, 8 to the respective brackets 46, as described above.

Figure 3:
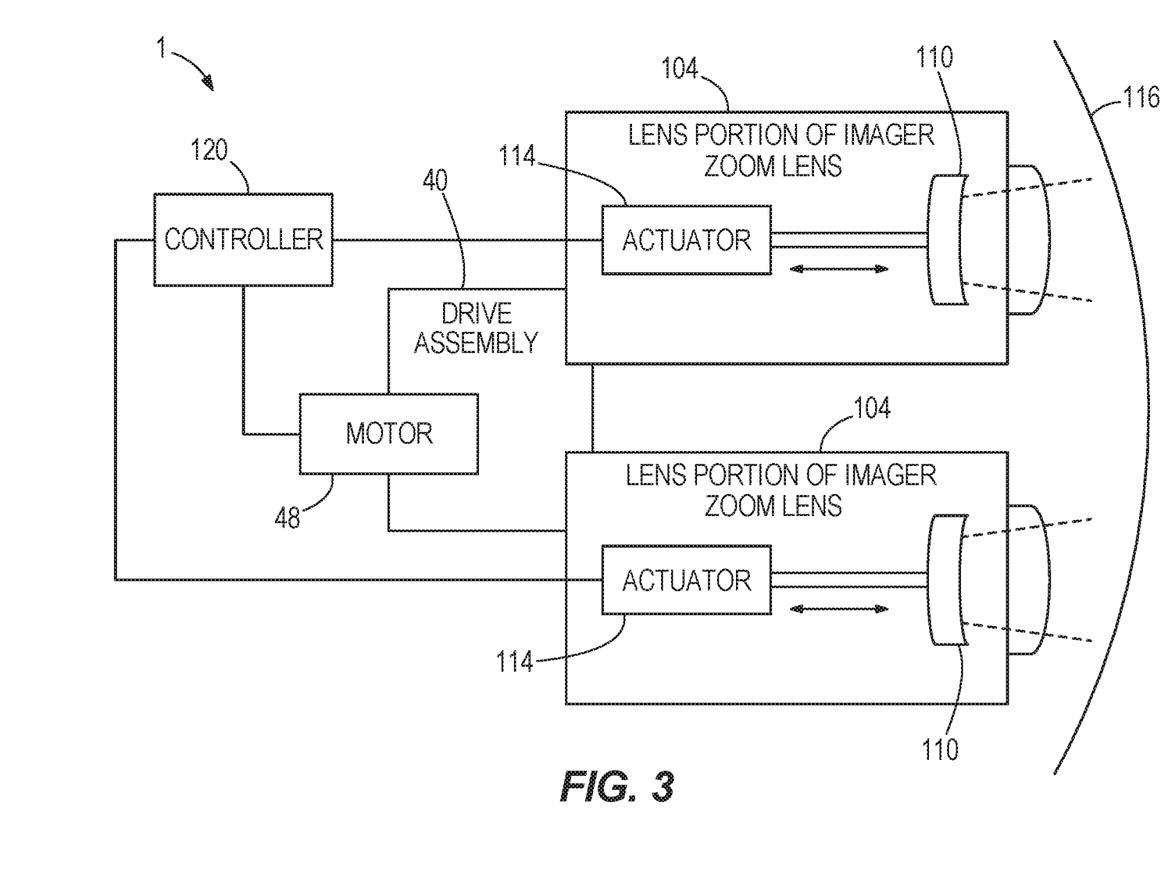
FIG. 3 is a schematic view of a configuration for a controller coordinating the movement of an exemplary multi-imager assembly.

The exemplary multi-imager assembly 1 shown in FIGS. 1 and 2 and described above can also be positioned inside of a dome structure 116 as shown in the schematic view of FIG. 3. For example, the dome structure 116 could cover and conceal the lens 110 of each of the plurality of imagers 2, 4, 6, 8, which is a common configuration for security camera assemblies.

FIG. 3 also schematically illustrates a controller 120 that coordinates the movement of the plurality of imagers 2, 4, 6, 8 to produce the composite image. In some exemplary embodiments, the controller 120 can be programmed in an open loop, in which the movements of the multi-imager assembly 1 are calibrated in a factory setting. In other exemplary embodiments, the controller 120 can be programmed in a closed loop, in which the controller 120 would receive feedback from a position sensor on either the lens 110 or on each of the plurality of imagers 2, 4, 6, 8.

In the exemplary multi-imager assembly 1, the controller 120 controls both the motor 48 of the drive assembly 40 and the lens actuators 114 of each of the plurality of imagers 2, 4, 6, 8. The controller 120 sends signals to produce angular actuations in increments of size ("delta"). Both the motor 48 and the lens actuators 114 are driven within a motion of a prescribed range. For example, the lens portion 104 can include a position measurement device to report a position value to the controller 120, and the drive assembly 40 can include a similar position measurement device. The lens actuator 114 zooms the lens of the imager between a wide field of view angle ("wide") and a narrow field of view angle ("tele") with the wide and tele field of view angles constituting an upper and lower limit of the lens field of view, respectively. The controller 120 is calibrated to assign angular increments based on the difference between the wide and tele field of view angles, divided by the controller delta. The lens actuator 114 can then provide any field of view angle between these two limits based on a position data feed to the controller 120. Similarly, the motor 48 of the drive assembly 40 can rotate the plurality of imagers 2, 4, 6, 8 between two prescribed angular limits, panoramic "wide" and panoramic "tele." The controller 120 is also calibrated to assign angular drive assembly increments based on the difference between panoramic wide and panoramic tele, divided by the controller delta. In this manner, the motor 48 can achieve any angle between those two limits based on a data feed to the controller 120.

The composite or panoramic image is produced and maintained by use of the following algorithms embedded in software that operates the controller 120, which coordinates the movement of the plurality of imagers 2, 4, 6, 8 to produce the composite image as described above. These equations maintain a uniform overall aspect ratio of the composite image such that the lens 110 of each of the plurality of imagers 2, 4, 6, 8 has the same varifocal characteristics, which are driven by the lens actuator 114 based on the data feed to the controller 120. For example, if the field of view angle at the tele position is $FoV_{TELE}$ and the field of view angle at the wide position is $FoV_{WIDE}$ then the following field of view function can be defined where the variable x can be any value between 0 and 1, including being equal to 0 and 1:

$$FoV_{IMAGER}(x)=(FoV_{WIDE}-FoV_{TELE})x+FoV_{TELE}$$

$$\text{at } x=0, FoV_{IMAGER}(0)=(FoV_{WIDE}-FoV_{TELE})*0+FoV_{TELE}=FoV_{TELE}$$

$$\text{at } x=0.5, FoV_{IMAGER}(0.5)=(FoV_{WIDE}+FoV_{TELE})/2$$

$$\text{at } x=1, FoV_{IMAGER}(1)=(FoV_{WIDE}-FoV_{TELE})*1+FoV_{TELE}=FoV_{WIDE}.$$

The variable x is proportional to the optical zoom value of the lenses 110 of each of the plurality of imagers 2, 4, 6, 8. If the optical zoom value is linearly proportional to the field of view, these linear imager equations would define how the field of view can vary with the optical zoom value of the lens 110. In other exemplary embodiments, if the lenses 110 of the plurality of imagers 2, 4, 6, 8 are configured with a non-linear optical zoom function, then additional terms (not shown) would be added to the above linear equations to replicate the non-linear behavior of the lenses 110.

As described below, the relative position of each individual imager's field of view within the overall panoramic view will be located by the individual field of view centerline for each of the plurality of imagers 2, 4, 6, 8. In this exemplary embodiment, the plurality of imagers' 2, 4, 6, 8 lenses 110 produce a continuous optically symmetric field of view, so that the center of the individual field of view coincides with the optical centerline of the imager lens 110 at all optical zoom values. If the imager lenses 110 are not continuously optically symmetric (i.e. asymmetric) at all zoom values, then additional terms would be added to the below equations to reflect the effects of this optical asymmetry. The drive assembly 40 of the multi-imager assembly 1 causes the centerline angles of each imager's field of view to vary by rotational translation to ensure a properly interconnected panoramic field of view. It is understood that, due to mechanism design constraints, the imager centerlines do not need to be exactly coincident. The scenes being viewed by the multi-imager assembly 1 are at much larger distances than the separation distances between the plurality of imagers 2, 4, 6, 8 within the multi-imager assembly 1, and thus the imager separation distances within the multi-imager assembly 1 have a very small relative effect on the panoramic view and can therefore be neglected.

The panoramic field of view has a centerline 124 that is considered as a primary reference, with the various individual imager fields of view symmetrically disposed on either side of the panoramic field of view centerline 124, as shown in FIGS. 4A-5B. Due to the symmetry involved, the governing relationships between the individual imager centerlines and the panoramic field of view centerline 124 depend on whether an odd or even number of individual imagers are utilized in creating the panoramic view. With an odd number of optically symmetric individual imagers, the panoramic field of view centerline 124 always coincides with the field of view centerline of the center individual imager. With an even number of optically symmetric individual imagers, the panoramic field of view centerline 124 never coincides with any individual imager's field of view centerline.

The number of individual imagers is represented by n, the cases of n=1 are excluded in the table below. A panoramic symmetric angle ϕ is defined as the angle between the individual imager centerlines of any two individual imagers symmetrically disposed on either side of the panoramic image centerline:

$$\phi(x,n)=(n-1)FoV_{IMAGER}(x).$$

Accordingly, (n−1) is the inverse slope of the relationship, and determines the mechanism rotational ratio needed to achieve a continuously interconnected panoramic view. For n=2, the inverse slope is 1 and therefore the mechanism ratio is 1 between the centerlines of those two individual imager centerlines. For n=3, the inverse slope is 2 and therefore the mechanism ratio is 2 between the centerlines of those two individual imager centerlines. When there are multiple sets of individual imager pairs symmetrically disposed on either side of the panoramic image centerline 124, the calculation is performed first with n set at the value for the set closest to the panoramic image centerline, and then the calculation is performed again with n set at the value of the set located in the next closest position relative to the panoramic image centerline. Thus, for n=4, the calculation would first be for n=2. For n=2, the inverse slope is 1, and therefore the mechanism ratio is 1 between the centerlines of those two individual imagers' centerlines closest to the panoramic field of view centerline 124. Then for n=4, the inverse slope is 3 and therefore the mechanism ratio is 3 between the centerlines of those two individual imagers' centerlines that are on the outside of the four-imager multi-imager assembly (i.e. the multi-imager assembly 1 shown in FIGS. 1 and 2), the next closest position relative to the panoramic image centerline 124.

The table provided below illustrates exemplary ($n_{pairA}-1$) mechanism ratios using the equation as described above:

| n | $n_{pair}$ | ($n_{pairA}-1$) * ϕ(x) | ($n_{pairB}-1$) * ϕ(x) | ($n_{pairC}-1$) * ϕ(x) |
|---|---|---|---|---|
| 2 | 2 | 1 ϕ(x) | N/A | N/A |
| 3 | 3 | 2 ϕ(x) | N/A | N/A |
| 4 | 4 | 3 ϕ(x) | N/A | N/A |
| 5 | 3, 5 | 2 ϕ(x) | 4 ϕ(x) | N/A |
| 6 | 4, 6 | 3 ϕ(x) | 5 ϕ(x) | N/A |
| 7 | 3, 5, 7 | 2 ϕ(x) | 4 ϕ(x) | 6 ϕ(x) |

Figure 4A:
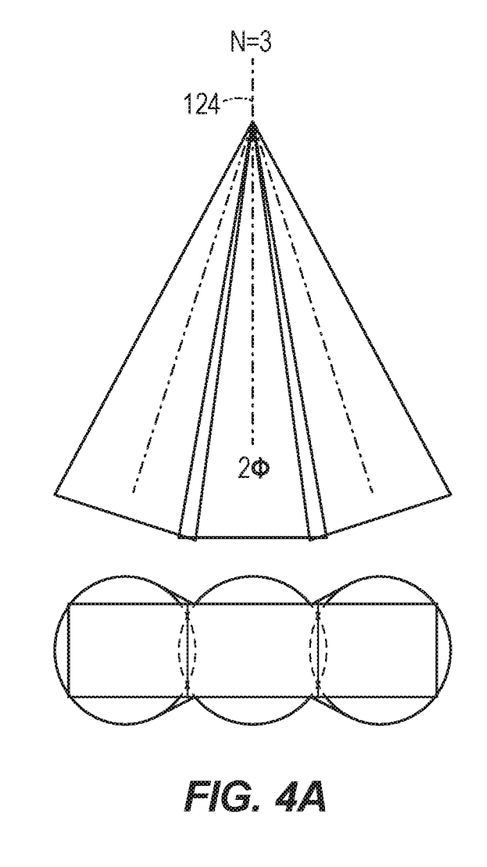
FIG. 4A is a schematic of a field of view for an exemplary multi-imager assembly having an odd number of imagers.
Figure 4B:
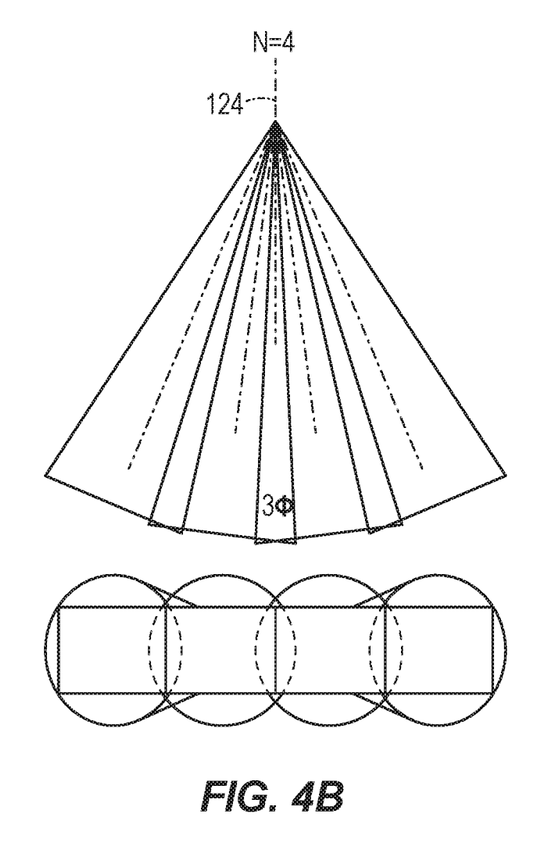
FIG. 4B is a schematic of a field of view for an exemplary multi-imager assembly having an even number of imagers.

A multi-imager assembly can be designed to support any number of imagers using the relationship described above. For example, FIG. 4A illustrates a schematic field of view for an odd number of imagers, specifically three imagers. FIG. 4B illustrates a schematic field of view for an even number of imagers, specifically four imagers. As shown in FIGS. 4A and 4B, the centerline 124 of the plurality of imagers is relative to the n value of the multi-imager assembly. Accordingly, as shown in FIGS. 4A and 4B, the multi-imager assemblies where n=3 or n=4 offer the best proposition for effective implementation of the invention because the panoramic views are symmetrical across the centerline 124.

Figure 5A:
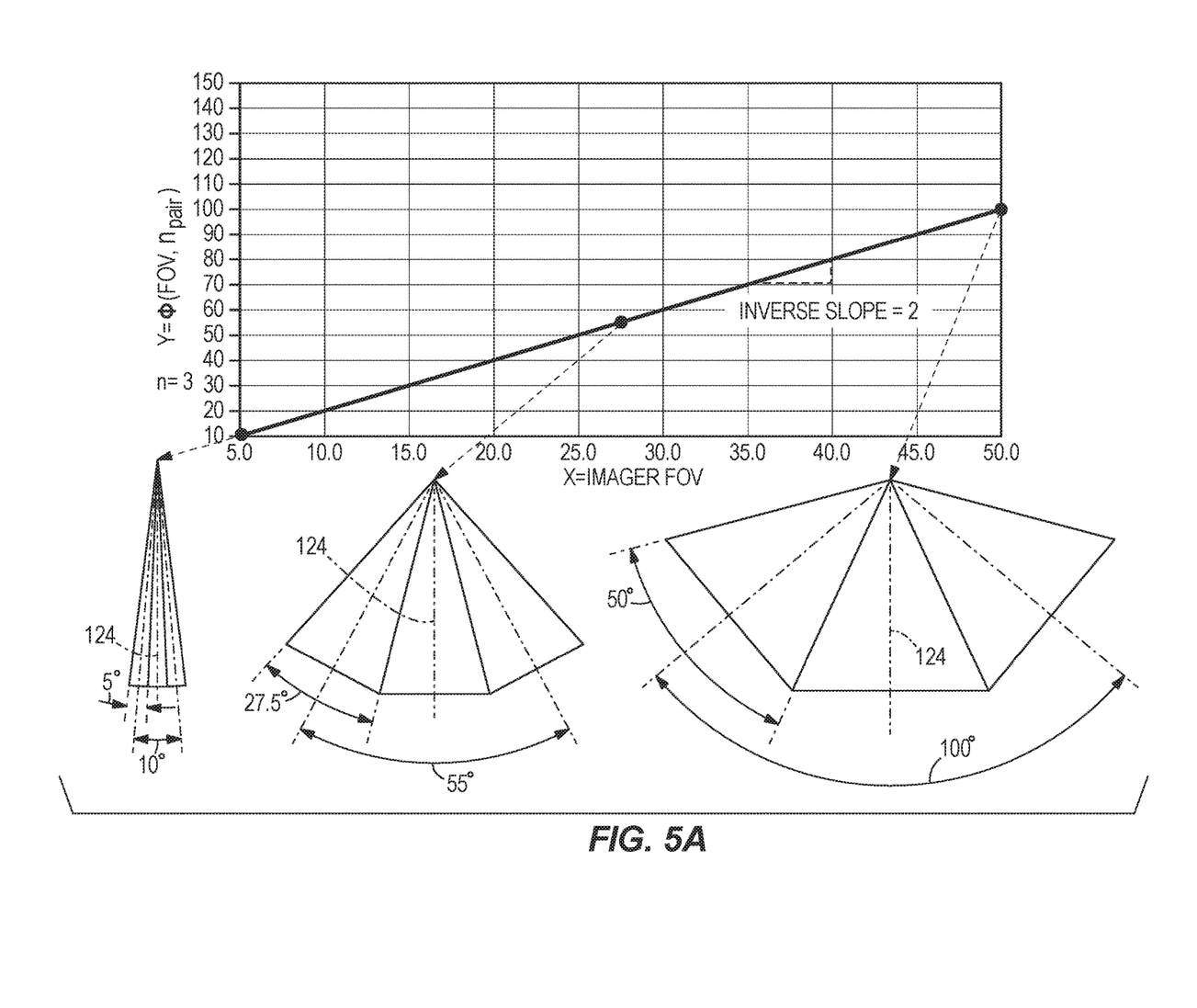
FIG. 5A is a graphical depiction of an exemplary multi-imager assembly having three imagers.
Figure 5B:
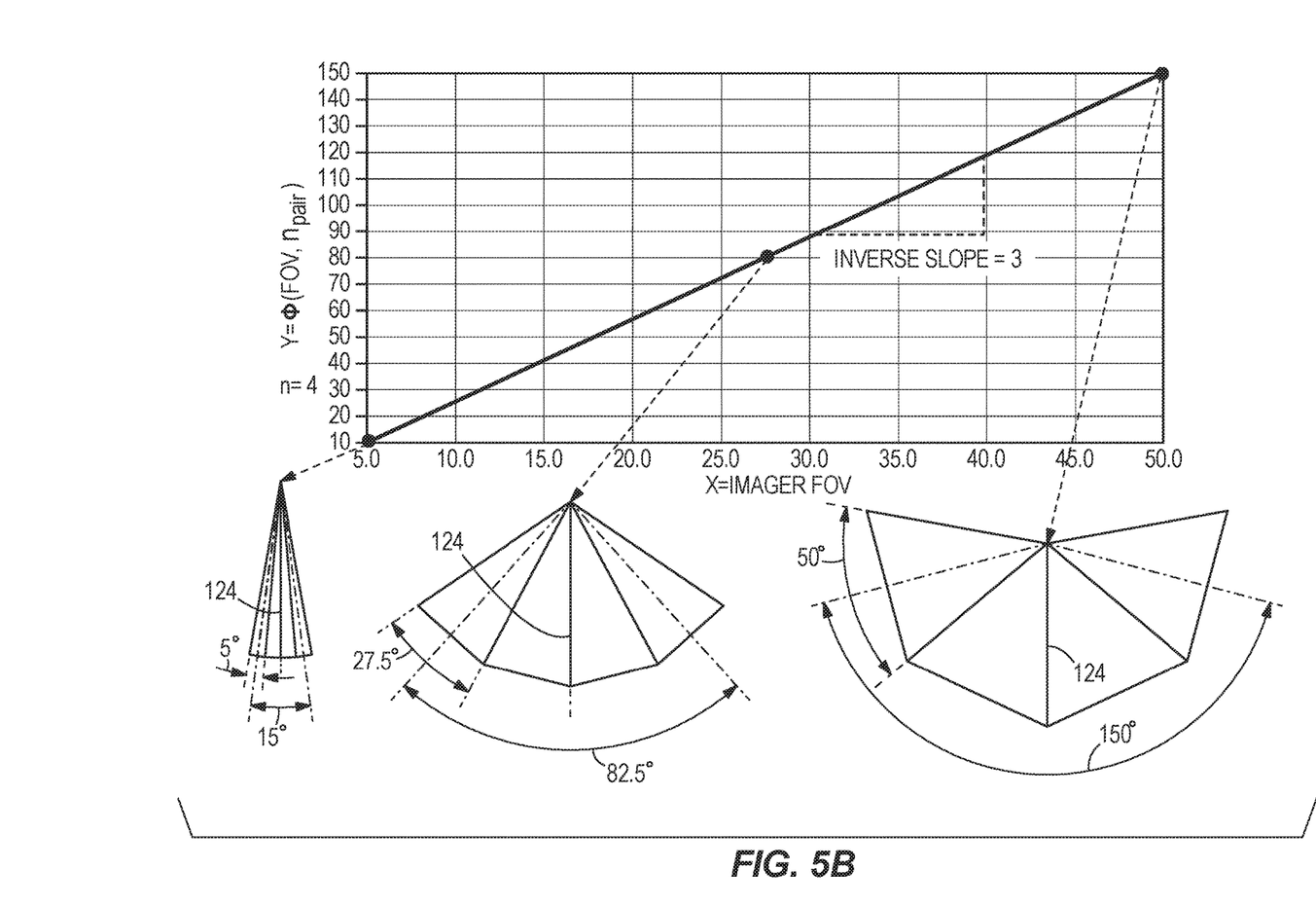
FIG. 5B is a graphical depiction of an exemplary multi-imager assembly having four imagers.

FIGS. 5A and 5B illustrate the graphical relationship of exemplary embodiments for multi-imager assemblies having three and four imagers (i.e., n=3 and n=4), respectively. In FIGS. 5A and 5B, the x-axis represents the field of view of the individual imager, and the y-axis represents a resulting panoramic symmetric angle $\phi$. FIGS. 5A and 5B also include schematic representations of the field of view angles with the panoramic centerlines 124, and the resulting panoramic symmetric angle $\phi$ at various points field of view of the individual imagers. For example in FIG. 5A representing n=3 imagers, when the field of view of the individual imagers is 50 degrees, the resulting panoramic angle is 100 degrees. In FIG. 5B representing n=4 imagers, when the field of view of the individual imagers is 50 degrees, the resulting panoramic angle is 150 degrees. The graphical representation of FIGS. 5A and 5B is based on the assumption of a basic interconnection of the individual imager's fields of view to form the panoramic field of view. There are some reasons, among others, to form the panoramic view from only a portion of the individual imager's field of view. These reasons could possibly include: 1) allowance for tolerances in optics, such as the variations in the plane of symmetry of center of the field of view during changes in the optical zoom; or 2) allowance for methods to increase the quality of panoramic view by applications of video processing operations to the individual imager's fields of view, such as dewarping, rotation, trimming, alignment, stitching, color correction, etc. Accordingly, a crop factor can be used to account for this variance. For example, when p=overlap/crop factor ranging between 0 and 1, the effective horizontal field of view angle is determined by the following equation:

$$FoV_{IMAGER,SCALED}(x)(1-p)FoV_{IMAGER}.$$

The above equation allows for the scaling of the individual field of view of each of the plurality of imagers 2, 4, 6, 8 to form a seamless panoramic image using the multi-imager 1 as described above.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

What is claimed is:

1. A multi-imager assembly comprising:
   a plurality of imagers, each of the plurality of imagers having optical zoom such that each of the plurality of imagers has a variable field of view;
   a chassis movably supporting the plurality of imagers;
   a drive assembly having a motor configured to drive movement of each of the plurality of imagers while supported by the chassis; and
   a controller electrically connected to the motor and to the plurality of imagers, and configured to coordinate movement of the plurality of imagers based at least in part on a selected field of view of each of the plurality of imagers to produce a composite image;
   wherein the controller is configured to vary the selected field of view of each of the plurality of imagers from a first selected field of view to a second selected field of view that is wider than the first selected field of view, and wherein the controller is further configured to drive the motor to move the imagers so that an angular spacing between respective field of view centerlines of the imagers increases when the field of view of the imagers changes from the first selected field of view to the second selected field of view, and decreases when the field of view of the imagers changes from the second selected field of view to the first selected field of view; and
   wherein the first selected field of view of each of the imagers provides a composite image having a first composite image panoramic angle, and wherein the second selected field of view of each of the imagers provides a composite image having a second composite image panoramic angle that is wider than the first composite image angle, and wherein a linear or near-linear relationship exists between the selected field of view of each of the imagers and the composite image panoramic angle for all selected fields of view between the first and second selected fields of views.

2. The multi-imager assembly of claim 1, wherein a mounting member is pivotably coupled to the chassis.

3. The multi-imager assembly of claim 1, wherein the drive assembly has a plurality of gears configured to drive movement of the plurality of imagers.

4. The multi-imager assembly of claim 3, wherein the plurality of gears includes a first pair of gears and a second pair of gears in intermeshing relation and having different numbers of teeth.

5. The multi-imager assembly of claim 4, wherein the first and second pair of gears have a gear ratio of 3-to-1.

6. The multi-imager assembly of claim 4, wherein the first pair of gears each has at least seventy-two teeth and the second pair of gears each has at least twenty-four teeth.

7. The multi-imager assembly of claim 1, wherein the chassis is configured to tilt about a horizontal axis of the multi-imager assembly.

8. The multi-imager assembly of claim 1, wherein the chassis is configured to pan about a vertical axis of the multi-imager assembly.

9. The multi-imager assembly of claim 1, wherein the plurality of imagers are each individually rotatable about a respective vertical axis, and wherein rotation is coordinated by the controller based on the selected field of view of each of the plurality of imagers.

10. The multi-imager assembly of claim 1, wherein the plurality of imagers are positioned inside a dome structure.

11. The multi-imager assembly of claim 1, wherein the plurality of imagers has at least two imagers.

12. The multi-imager assembly of claim 1, wherein the plurality of imagers has at least four imagers.

13. The multi-imager assembly of claim 1, wherein each of the plurality of imagers includes a lens portion having a lens actuator and a lens, the controller being electrically connected to the lens actuator.

14. The multi-imager assembly of claim 13, wherein the lens actuator drives the lens to produce the selected field of view.

15. The multi-imager assembly of claim 14, wherein the lens produces the selected field of view from a wide field of view angle to a narrow field of view angle.

16. The multi-imager assembly of claim 1, wherein the controller is programmed in an open loop in which movement of the plurality of imagers is calibrated in a factory setting.

17. The multi-imager assembly of claim 1, wherein the controller is programmed in a closed loop in which the controller receives feedback from a position sensor on at least one of the plurality of imagers.

18. A method of providing a composite image with a variable field of view, the method comprising:
providing a plurality of imagers, each of the plurality of imagers having optical zoom such that each of the plurality of imagers has a variable field of view;
providing a chassis movably supporting the plurality of imagers;
providing a drive assembly having a motor configured to drive movement of each of the plurality of imagers while supported by the chassis; and
coordinating movement of the plurality of imagers based at least in part on a selected field of view of each of the plurality of imagers to produce the composite image;
wherein coordinating movement is achieved with a controller configured to vary the selected field of view of each of the plurality of imagers from a first selected field of view to a second selected field of view that is wider than the first selected field of view, and wherein the controller is further configured to drive the motor to move the imagers so that an angular spacing between respective field of view centerlines of the imagers increases when the field of view of the imagers changes from the first selected field of view to the second selected field of view, and decreases when the field of view of the imagers changes from the second selected field of view to the first selected field of view; and
wherein the first selected field of view of each of the imagers provides a composite image having a first composite image panoramic angle, and wherein the second selected field of view of each of the imagers provides a composite image having a second composite image panoramic angle that is wider than the first composite image angle, and wherein a linear or near-linear relationship exists between the selected field of view of each of the imagers and the composite image panoramic angle for all selected fields of view between the first and second selected fields of views.

19. The multi-imager assembly of claim 1, wherein the field of view of each of the plurality of imagers is continuously variable between the first selected field of view and the second selected field of view, and wherein the angular spacing between respective field of view centerlines of the imagers is also continuously variable to achieve a continuously interconnected panoramic view.

* * * * *